United States Patent [19]

Walters et al.

[11] Patent Number: 5,132,596
[45] Date of Patent: Jul. 21, 1992

[54] OUTDOOR LIGHTING CONTROLS

[75] Inventors: Jeff D. Walters, Marshfield; Paul M. Buonpane, Lexington, both of Mass.

[73] Assignee: Pacific Scientific Company, Weymouth, Mass.

[21] Appl. No.: 584,087

[22] Filed: Sep. 18, 1991

[51] Int. Cl.[5] .............................................. H05B 37/02
[52] U.S. Cl. .................................. 315/159; 315/149; 250/206
[58] Field of Search ................ 315/149, 159; 250/206, 250/215, 239, 214 AL; 335/90, 104, 78

[56] References Cited

U.S. PATENT DOCUMENTS

| | | | |
|---|---|---|---|
| 3,952,192 | 4/1976 | Turner | 315/159 |
| 4,095,100 | 6/1978 | Selick | 315/159 |
| 4,209,728 | 6/1980 | Membreno | 315/159 |
| 4,356,405 | 10/1982 | Russo | 315/159 |
| 4,626,811 | 12/1986 | McKee | 335/104 |
| 4,733,103 | 3/1988 | Itoh | 315/159 |
| 4,991,054 | 2/1991 | Walters | 315/159 |

Primary Examiner—Eugene R. LaRoche
Assistant Examiner—A. Zarabian
Attorney, Agent, or Firm—Stanger, Michaelson, Spivak & Wallace

[57] ABSTRACT

An outdoor lighting control includes a photosensor responsive to ambient outdoor light and an alternating current relay with a pair of contacts movable between make and break positions. The relay includes a contact actuating arrangement that responds to the photosensor and alternating current bias the contacts into a make position and move the contacts electromagnetically into a break position. The contact actuating arrangement is sufficiently stiff and responsive to the alternating current to limit chatter in the contact during passage from make to break to fifteen milliseconds when the photosensor senses a transition between dark and daylight. Preferably, the chatter is limited between 1 and 10 milliseconds.

7 Claims, 1 Drawing Sheet

OUTDOOR LIGHTING CONTROLS

BACKGROUND OF THE INVENTION

This invention relates to outdoor lighting controls (OLCs) and particularly to improvements for extending the life span of outdoor lighting controls.

In one type of outdoor lighting control, a normally open alternating current (AC) relay responds to a photosensitive element which acts to open and close current in the relay's contacts on the basis of ambient light conditions and thereby turn on a lamp during the night and turn it off during daylight. At night the photosensitive element limits the current to the relay which closes the relay contacts. This connects the lamp from its power source and turns the light on. During daylight, the photosensitive elements permits higher alternating current to open the contacts. This opens the circuit from the alternating current lines to the lamp and turns the light off in daylight.

OLCs must operate reliably for long periods such as ten years. However, their life span has often been much shorter and their operation unreliable because the relay contacts often exhibit chatter, i.e. rapid opening and closing, as the OLC operation shifts from one condition to another during the change from daylight to night at dusk, and from night to day at dawn. The very slow change in light intensity exacerbates this effect. The repeated opening and closing of the contacts causes them to wear out and the lighting control to operate unreliably. Eventually this reduces the life span of the OLC.

OBJECTS AND SUMMARY OF THE INVENTION

An object of the invention is to improve outdoor lighting controls.

Another object of the invention is to avoid these difficulties.

According to a feature of this invention, these objects are attained in whole or in part by making the contact actuating portion of the relay sufficiently stiff and responsive to alternating current to limit the chatter to less than 15 milliseconds.

Another feature of the invention involves including in the contact actuating portion a winding with an axial core and a shading core and placing the shading coil on the axial core of the relay's winding inside the longitudinal bounds of the winding.

Another feature of the invention involves stiffening the contact carrier of the relays armature to limit chatter to less than 15 milliseconds.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
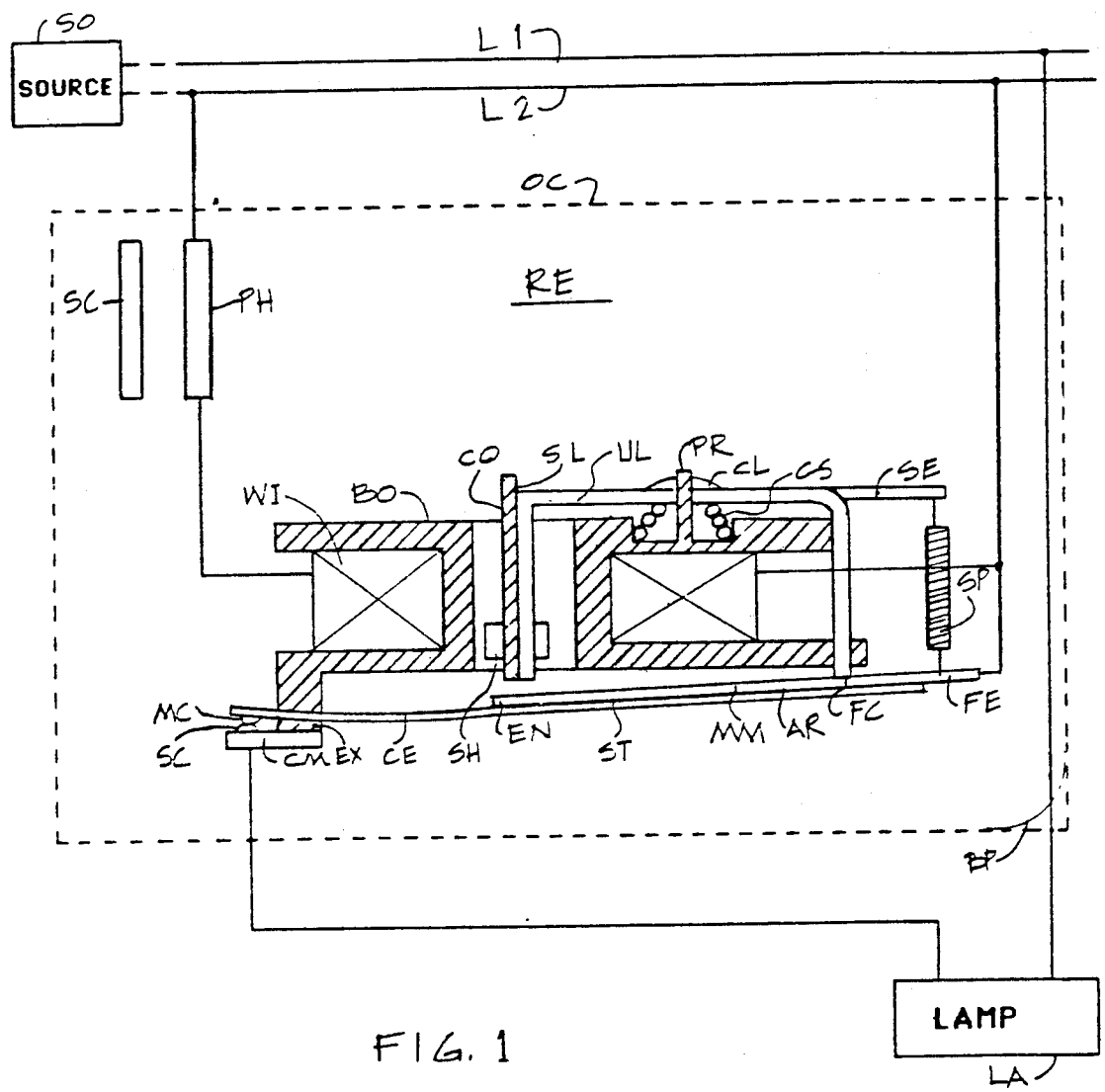
FIG. 1 is a partially cross-sectional plan view and partially schematic illustration of an outdoor lighting control connected in a network and embodying features of the invention.

In FIG. 1, a utility power source SO or transformer energizes power lines L1 and L2, and an outdoor lighting control (OLC) OC embodying features of the invention controls the current from the lines L1 and L2 to a lamp LA which may for example be mounted on a utility pole (not shown). The control OC responds to ambient light by interrupting current flow to the lamp LA during the day and closing its contacts to pass current to the fixture at night, to make the lamp illuminate the surrounding area. Suitable shielding (not shown) prevents the control OC from responding to the light of the lamp LA. At the same time, the control OC is adjusted to interrupt the current in response to light intensities greater than the intensities normally available at night from surrounding lamps.

In the control OC, a photoresistor PH responds to passage of ambient light through an adjustable perforated light screen SC and varies the resistance between the line L2 and a winding WI of a relay RE. The opposite end of the winding WI connects the relay to the line L2. Thus the photoresistor PH determines the current passing through the winding WI.

A bobbin BO supports the winding WI and a magnetic axial core CO composed of a straight lamination SL and a U lamination UL projects through the center of the bobbin. A shading coil SH surrounds the core CO within the axial extent of the bobbin BO and preferably the winding WI.

A projection PR extending integrally from the bobbin BO and a clamp composed of a so called Tinnermann clip CL and a conical spring CS mount the core CO and bobbin BO relative to each other. Straight lamination SL and the U lamination UL are welded or otherwise secured to each other. A spring extension SE cantilevered integrally and outwardly from the U lamination UL supports one end of a tension spring SP whose other ends pulls upwardly on one fulcrum end FE of an armature AR. The outer end of the U lamination UL forms a fulcrum FC for the armature AR. Suitable extensions (not shown) from the bobbin BO engage the armature AR to prevent lateral or longitudinal movement of the armature.

Forming the armature AR is a magnetic member MM which terminates at an end EN beyond the core CO and an electrically conductive strip ST of beryllium-copper which terminates in a movable conductive contact MC. In the normal or rest position of the relay RE, the spring SP draws the fulcrum end FE of the armature AR upwardly as shown in the drawing about the fulcrum FC and forces the movable contact MC against a stationary contact SC mounted on a conductive member CM secured to an extension EX of the bobbin BO. In this position, the force of the spring SP flexes the cantilevered end CE of the strip ST holding the movable contact MC as the latter engages the stationary contact ST. This flexure of the end CE causes a wiping action between the contacts MC and SC when the contacts first engage each other and a dewiping action when they disengage.

When the alternating current through the winding WI exceeds a threshold the current induces a magnetic field sufficient to cause the magnetic core CO to attract the magnetic member MM of the armature AR against the force of the spring FC. The current through the winding induces a magnetic field in the core CO, and the latter imposes an attractive force upon the end EN of the magnetic member MM of the armature AR. This occurs regardless of the direction of the current.

It is believed that in effect, the alternating current theoretically attempts to produce a force having an amplitude corresponding to a full-wave rectified sine wave. The shading coil SH of a single heavy copper turn conducts a current induced by the magnetic field which the winding WI initially induces in the core CO. The shading coil SH thus constitutes the secondary of the transformer in which the winding WI is the primary. The current in the secondary is 90 degrees out of phase with the current in the primary. This result in the core CO applying a force with two components, a rectified-sine component and a second rectified sine component shifted 90 degrees. This constitutes a unidirectional force having a ripple. It is believed that the position of the shading ring SH inside the winding WI causes efficient generation of a flux component with an amplitude nearly as large as the flux from winding WI and nearly a 90 degree phase shift. This is useful in reducing chatter.

When the photoresistor PH exhibits a resistance below a threshold, i.e. enough to allow a threshold current through the winding W1, the unidirectional force upon the armature AR is sufficiently great to attract the armature end EN toward the core CO against the force of the spring SP, and the conductive end EN draws the movable contact MC away from the stationary contact SC. However, during the initial movement of the armature AR, the movable contact does not break with the contact SC but rather the flexed conductive end begins to unflex. During this time, the movable contact MC dewipes against the stationary contact SC in a substantially lateral direction along the long dimension of the armature AR before breaking contact. This dewiping action tends to smooth out any pits caused by sparking of the contact MC and SC when they make contact (make operation) and break contact (break operation).

In a normal position of the relay RE, when the contacts MC and SC are in the make position, current flows from the line L2 through the contacts MC and SC to the LA and back to the line L1. In the break position, the contacts MC and SC do not conduct across the gap between them and thereby interrupt current flow through the lamp LA.

The strip ST is sufficiently stiff in view of the ripple, and in view of the remaining stiffness of the members supporting the contacts MC and SC, to lower its flexing and wiping of the contacts MC and SC to the point that any chatter upon making or breaking contact is less than 15 milliseconds and preferably between 1 and 10 milliseconds.

In operation, the photosensor PH senses ambient light through or over the screen SC which is movable into and out of the paper as shown in FIG. 1 to permit calibration of the OLC. During the night, the low light raises the resistance of the photoresistor PH and limits the current flow to the winding W1 to a value insufficient for the core CO to overcome the force of the spring SP. The relay RE then remains in its normal or rest position. That is, the contacts MC and SC engage each other. This allows current flow from the line L2 through the contacts MC and SC to the LA and back to the line L1.

At dawn, the resistance of the photoresistor PH decreases and at a threshold determined by the characteristics of the relay and the position of the screen SC, the core CO draws the armature AR toward the core CO and causes the contacts MC and SC to disengage and break. Current then ceases the flow to the lamp LA until the evening when darkness again raises the resistance of the photoresistor PH until insufficient current flows in the winding WI to attract the armature AR. The spring SP causes the armature AR to return to its normal position in which the contacts MC and SC engage each other.

The core CO attracts the armature to break engagement between the contacts MC and SC when the current through the winding W1 and the resulting magnetic field reach a threshold value. The alternating ripple on the constant force makes the starting point somewhat indefinite and results in chatter, i.e. repeated opening and closing of the contacts MC and SC.

According to one theory, threshold value would first be reached when the ripple reaches its peak. This causes the end CE of the strip ST to unflex and the contacts MC and SC to dewipe and disengage in response to the magnetic force of the core CO. However, as the ripple passes its peak, instantaneous force may actually drop even though the average force continues to go up in response to increasing ambient light. Accordingly, the contact MC tends to move more slowly or perhaps even drop back toward the contact SC reengage the contact SC. This may happen several times over several ripples and continue for as much as fifty milliseconds.

This effect is exacerbated by the slowness with which the ambient light brightens at dawn or darkens in the evening. Under these circumstances, although the average force is slowly increasing, the moving contact MC is repeatedly being moved back and forth and chattering against the contact SC. This hastens the destruction of the contacts MC and SC.

According to the invention, the strip ST is sufficiently stiff to limit the flexure of the end CE in the wiping action of the contacts MC and SC in proportion to the ripple so as to limit the chatter to less than fifteen milliseconds. At the same time, it is believed that placing the shading ring SH within the axial bounds of the bobbin BO within the winding W1 causes a closer linking of the winding WI with the shading coil SH beyond that produced by the core CO so as to further smooth the ripple. A third effect may arise from the stiffening effect of the stationary and movable contacts SC and MC both being mounted or unitized on the bobbin BO. The combined effects are believed to help limit the chatter time.

The conical spring CS and Tinnermann clip oppose each other. The U lamination UL, straight lamination SL, shading ring SH, armature AR, spring SP, strip ST, and contact MC move as a single unit to adjust the contact gap. Hence the relay spring force never changes for any contact gap. The bobbin BO is stationary.

The strip ST is made of a springy, stiff, resilient material.

The stiff strip ST substantially increases the speed of breaking of contact. Furthermore, the stiff strip ST permits a short travel distance for the member MM on the armature AR. According to another embodiment of the invention relationships of the ripple and the stiffness of the strip ST and other parts is such as to limit the chatter time to between one millisecond and ten milliseconds.

The entire OLC structure is mounted on a base plate BP shown only as a curved line in FIG. 1.

Figure 2:
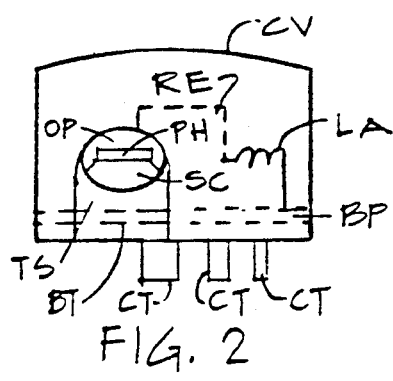
FIG. 2 is an elevation of the outdoor lighting control shown in FIG. 1 and embodying features of the invention.

As shown in FIG. 2, the base plate BP with the relay RE, photosensor PH and screen SC is covered with a plastic cover CV having a light opening OP that reveals the photosensor PH and the screen SC mounted within a track support TS. Connectors CT project from the base plate. A coiled lightning arrestor AR connects the relay, preferably the armature A to ground.

The invention is based upon the recognition that the wiping and dewiping effects are less than usual but that over a 10 year life span the OLC contacts will make and break less than five thousand times and that each time the make and especially the break will be comparatively slow. The invention reduces the chatter.

The straight lamination SL projects upwardly t concentrate the flux which would normally leak from the core. The invention uses only two laminations rather than three or more to assure as flat a top as possible on the core CO and therefore the most intimate possible contact with the member MM. It also fixes the thickness of the core more closely than otherwise.

The small range of travel of the member MM allows reliability in spring tension of the spring SP.

While embodiments of the invention have been described in detail it will be evident to those skilled in the art that the invention may be embodied otherwise without departing from its spirit and scope.

What is claimed is:

1. An outdoor lighting control for a lamp to be energized by an alternating current, comprising:
   a photosensitive means for varying its characteristics in response to ambient outdoor light;
   an alternating current relay having a pair of contacts movable between make and break positions;
   said alternating current relay having contact actuating means responsive to said photosensitive means and to the alternating current for biasing said contacts into the make position and moving the contacts into the break position;
   said contact actuating means being sufficiently stiff and responsive to the alternating current to limit chatter in the contacts during passage from the make position to the break position to 15 milliseconds when the photosensitive means sense a transition between dark and daylight.

2. A device as in claim 1, wherein said alternating current relay includes:
   a core;
   a winding surrounding said core and defining axial extremities;
   a shading ring surrounding said core;
   said shading ring being placed within the winding and within the axial extremities of said winding.

3. A device as in claim 1, wherein said relay includes:
   a core;
   a bobbin surrounding said core;
   a winding on said bobbin;
   means mounted on said bobbin for holding one of said contacts;
   means mounted on said core for holding the other of said contacts.

4. A device as in claim 2, wherein said relay includes a bobbin for holding said winding;
   means mounted on said bobbin for holding one of the contacts;
   means mounted on said core for holding the other of said contacts.

5. A device as in claim 2, wherein said shading ring is placed to produce closer linking of said winding with said shading ring beyond that produced by the core so as to effect smoothing of ripple in currents in the winding.

6. An apparatus as in claim 4, wherein said shading ring is placed to produce closer linking of said winding with said shading ring beyond that produced by the core so as to effect smoothing of ripple in currents in the winding.

7. A device as in claim 3, wherein said means mounted on said bobbin and said means mounted on said core form means for stiffening the operation of the contacts.

* * * * *